United States Patent
Wu et al.

(10) Patent No.: US 6,176,224 B1
(45) Date of Patent: *Jan. 23, 2001

(54) METHOD OF OPERATING AN INTERNAL COMBUSTION ENGINE WHICH USES A LOW ENERGY GASEOUS FUEL

(75) Inventors: Min Wu; Dennis Walling, both of Lafayette, IN (US); John J. Bernardi, Chillicothe; Richard P. Staab, Metamora, both of IL (US)

(73) Assignee: Caterpillar Inc., Peoria, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/050,589

(22) Filed: Mar. 30, 1998

(51) Int. Cl.$^7$ .............................. F02B 43/00; F02B 41/00
(52) U.S. Cl. ............................................. 123/527; 123/681
(58) Field of Search ................................... 123/525, 527, 123/27 GE, 179.16, 672, 681, 682, 683, 698, 700; 60/674, 676

(56) References Cited

U.S. PATENT DOCUMENTS

| | | | |
|---|---|---|---|
| 4,388,611 | 6/1983 | Haferd | 340/347 SH |
| 4,411,243 | * 10/1983 | Hardenberg et al. | 123/525 |
| 4,492,205 | 1/1985 | Jundt et al. | 123/489 |
| 4,528,957 | 7/1985 | Jundt et al. | 123/440 |
| 4,617,900 | * 10/1986 | Kobayashi et al. | 123/492 |
| 4,843,558 | * 6/1989 | Bergnann et al. | 123/681 |
| 4,993,386 | * 2/1991 | Ozasa et al. | 123/480 |
| 5,140,959 | * 8/1992 | Durbin | 123/299 |
| 5,197,450 | * 3/1993 | Kitajima et al. | 123/1 A |
| 5,224,347 | 7/1993 | Yakabe et al. | 60/274 |
| 5,226,396 | * 7/1993 | Bailey | 123/575 |
| 5,239,974 | * 8/1993 | Ebinger | 123/493 |
| 5,251,602 | 10/1993 | Kurihara et al. | 123/527 |

(List continued on next page.)

Primary Examiner—Thomas N. Moulis
(74) Attorney, Agent, or Firm—Maginot, Addison & Moore

(57) ABSTRACT

A method of controlling a internal combustion engine assembly is disclosed. The internal combustion engine assembly includes (i) a internal combustion engine having an engine inlet and an engine outlet, (ii) a mixing chamber having an air inlet, a gaseous fuel inlet, and a fuel-air mixture outlet, (iii) a fuel valve which controls a ratio of air-to-gaseous fuel in a fuel-air mixture advanced through the fuel-air mixture outlet of the mixing chamber, and (iv) a throttle operable to control flow rate of the fuel-air mixture which is advanced from the fuel-air mixture outlet to the engine inlet. The method includes the step of determining oxygen content of exhaust gases advanced through the engine outlet and generating a oxygen content signal in response thereto. The method further includes the step of determining a load on the internal combustion engine and generating a load signal in response thereto. The method still further includes the step of adjusting the fuel valve to alter the ratio of air-to-gaseous fuel in the fuel-air mixture advanced through the fuel-air mixture outlet of the mixing chamber based on the oxygen content signal and the load signal. The internal combustion engine assembly further includes an exhaust conduit positioned in fluid communication with the engine outlet, and an oxygen sensor positioned in the exhaust conduit for generating the oxygen content signal. The internal combustion engine assembly further includes a pressure sensor positioned in a fuel-air mixture conduit for generating the load signal. An internal combustion engine assembly is also disclosed.

16 Claims, 3 Drawing Sheets

U.S. PATENT DOCUMENTS

| | | | |
|---|---|---|---|
| 5,255,657 | 10/1993 | Stellwagen | 123/527 |
| 5,261,382 | 11/1993 | Nikolai | 123/680 |
| 5,311,849 | 5/1994 | Lambert et al. | 123/337 |
| 5,337,722 | 8/1994 | Kurihara et al. | 123/527 |
| 5,341,299 | 8/1994 | Stellwagen et al. | 364/431.05 |
| 5,353,765 | 10/1994 | Saikalis et al. | 123/438 |
| 5,413,078 | 5/1995 | Mitsunaga et al. | 123/492 |
| 5,426,934 * | 6/1995 | Hunt et al. | 123/681 |
| 5,465,697 | 11/1995 | Hamburg et al. | 123/424 |
| 5,474,053 | 12/1995 | Suzuki | 123/685 |
| 5,476,085 | 12/1995 | Becker et al. | 123/685 |
| 5,529,048 | 6/1996 | Kurihara et al. | 123/685 |
| 5,666,923 | 9/1997 | Collier, Jr. et al. | 123/488 |
| 5,692,478 * | 12/1997 | Nogi et al. | 123/527 |
| 5,703,777 * | 12/1997 | Buchhop et al. | 123/27 GE |
| 5,983,877 * | 11/1999 | Madugula et al. | 123/681 |

* cited by examiner

METHOD OF OPERATING AN INTERNAL COMBUSTION ENGINE WHICH USES A LOW ENERGY GASEOUS FUEL

TECHNICAL FIELD OF THE INVENTION

The present invention relates generally to a method of operating a internal combustion engine, and particularly to a method of operating an internal combustion engine which uses a low energy gaseous fuel.

BACKGROUND OF THE INVENTION

Low energy gaseous fuels are an abundant source of cheap energy. These gases are released by coal mines and landfills and contain a quantity of hydrocarbon fuel, such as methane. Typically, these gases can contain as much as fifty percent hydrocarbon fuel, but some sources contain as little as thirty percent hydrocarbon fuel.

One use for this low energy gaseous fuel is to power an internal combustion engine. The internal combustion engine can be used to drive a generator to produce electricity. The electricity can then be fed into a power grid of an electric utility company in order to generate revenue, or alternatively the electricity can be fed to devices (e.g. lights, pumps, etc.) located proximate the generator in order to power such devices.

A drawback to using low energy gaseous fuels is that internal combustion engines that have heretofore been designed cannot be reliably run with fuels that have a hydrocarbon fuel content of less than forty five percent. In these engines, to combust a low energy gaseous fuel with a hydrocarbon fuel content of less than forty five percent, it is necessary to add natural gas, which has a higher energy content, to increase the energy content of the gaseous fuel. A disadvantage to adding natural gas to the low energy gaseous fuel is that natural gas is more expensive than the low energy gaseous fuel.

One objective when using an internal combustion engine is to reduce emissions of oxides of nitrogen ($NO_x$) during operation thereof. $NO_x$ is produced when nitrogen and oxygen are combined at the high temperatures associated with combustion. Catalytic converters have been used with various internal combustion engines to control the emissions of $NO_x$. A disadvantage to the use of catalytic converters is that catalytic converters cannot satisfactorily reduce emissions produced by internal combustion engines that combust low energy gaseous fuels. However, emissions can be reduced to a satisfactory level by precisely controlling the ratio of air to fuel combusted in the internal combustion engine.

What is needed therefore is an apparatus and method for controlling an internal combustion engine that uses a low energy gaseous fuel which overcomes one or more of the above-mentioned drawbacks.

DISCLOSURE OF THE INVENTION

In accordance with a first embodiment of the present invention, there is provided a method of controlling an internal combustion engine assembly. The internal combustion engine assembly includes an internal combustion engine having an engine inlet and an engine outlet; a mixing chamber having an air inlet, a gaseous fuel inlet, and a fuel-air mixture outlet; a fuel valve which controls the ratio of air-to-gaseous fuel in a fuel-air mixture advanced from the fuel-air mixture outlet of the mixing chamber; and a throttle operable to control flow rate of the fuel-air mixture which is advanced from the fuel-air mixture outlet to the engine inlet. The method includes the step of determining oxygen content of exhaust gases advanced through the engine outlet and generating a oxygen content signal in response thereto. The method further includes the step of determining a load on the internal combustion engine and generating a load signal in response thereto. The method yet further includes the step of adjusting the fuel valve to alter the ratio of air-to-gaseous fuel advanced through the fuel-air mixture outlet of the mixing chamber based on the oxygen content signal and the load signal.

In accordance with a second embodiment of the present invention, there is provided a method of controlling an internal combustion engine assembly. The internal combustion engine assembly includes (i) an internal combustion engine having an engine inlet and an engine outlet; (ii) a mixing chamber having an air inlet, a gaseous fuel inlet, and a fuel-air mixture outlet; (iii) a fuel valve which controls the ratio of air-to-gaseous fuel in a fuel-air mixture advanced from the fuel-air mixture outlet of the mixing chamber; and (iv) a throttle operable to control flow rate of the fuel-air mixture which is advanced from the fuel-air mixture outlet to the engine inlet. The method includes the step of determining oxygen content of exhaust gases advanced through the engine outlet and generating a oxygen content signal in response thereto. The method further includes the step of determining a load on the internal combustion engine and generating a load signal in response thereto. The method still further includes the step of adjusting the fuel valve to alter the ratio of air-to-gaseous fuel advanced through the fuel-air mixture outlet of the mixing chamber based on the oxygen content signal and the load signal. The internal combustion engine assembly further includes an exhaust conduit positioned in fluid communication with the engine outlet, and an oxygen sensor positioned in the exhaust conduit for generating the oxygen content signal. The internal combustion engine assembly further includes a fuel-air mixture conduit which couples the fuel-air mixture outlet to the engine inlet, and a pressure sensor positioned in the fuel-air mixture conduit for generating the load signal.

In accordance with a third embodiment of the present invention, there is provided a internal combustion engine assembly. The internal combustion engine assembly includes (i) an internal combustion engine having an engine inlet and an engine outlet, (ii) a mixing chamber having an air inlet, a fuel inlet, and a fuel-air mixture outlet, (iii) an exhaust conduit positioned in fluid communication with the engine outlet, (iv) an oxygen sensor positioned in the exhaust conduit for generating the oxygen content signal, (v) a fuel-air mixture conduit which couples the fuel-air mixture outlet to the engine inlet, (vi) a pressure sensor positioned in the fuel-air mixture conduit for generating the load signal, (vii) an engine controller which receives the oxygen content signal and the load signal and generates a fuel valve adjustment signal in response thereto, and (viii) a fuel valve which controls the ratio of air-to gaseous-fuel in a fuel-air mixture advanced from the fuel-air mixture outlet of the mixing chamber based on the fuel valve adjustment signal.

BEST MODE FOR CARRYING OUT THE INVENTION

Figure 1:
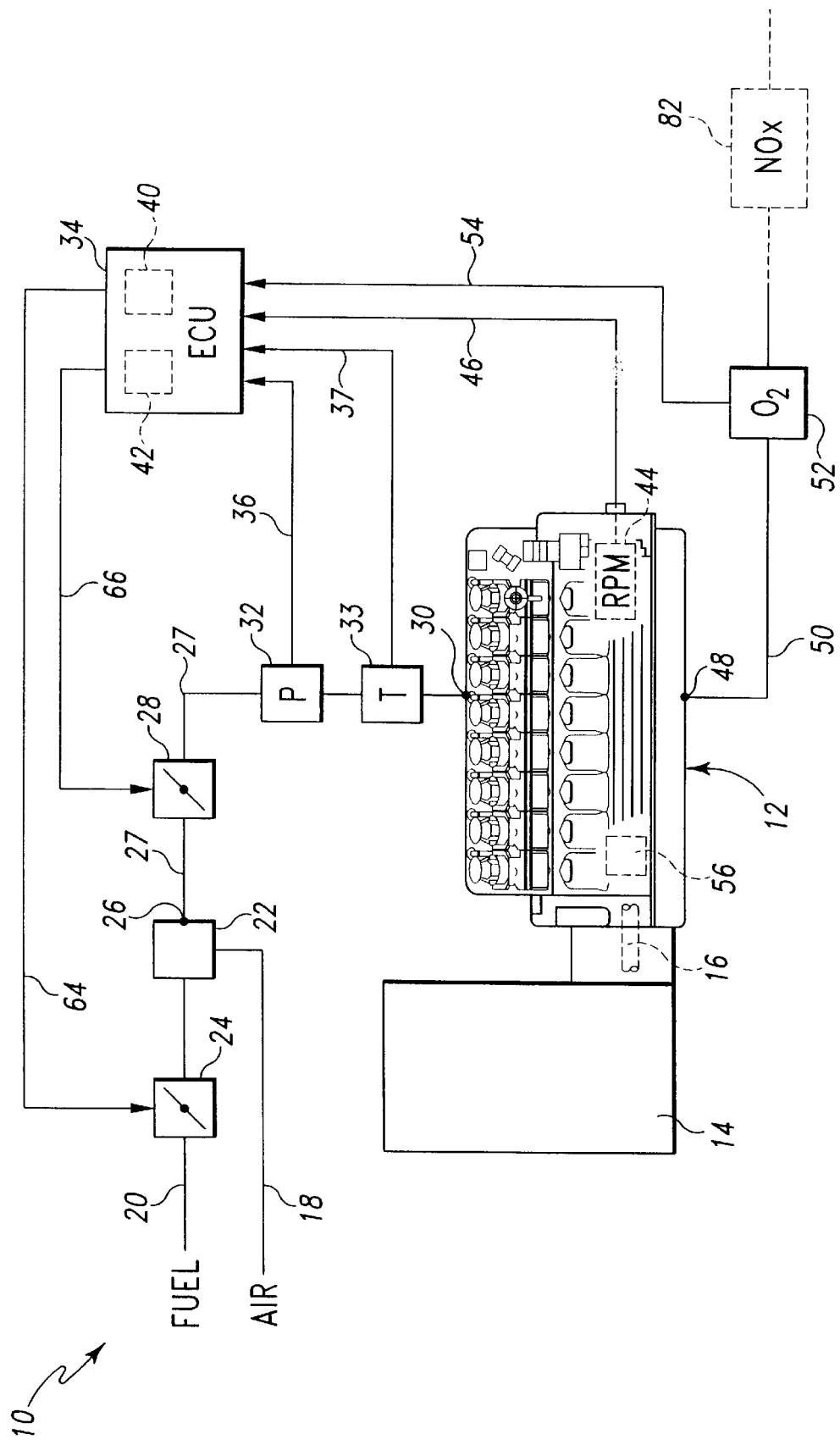
FIG. 1 is a schematic view of an internal combustion engine assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown an internal combustion engine assembly 10 which includes an internal combustion engine, hereafter referred to as the engine, 12 and a generator 14. The engine 12 is a spark ignition engine commercially available from Caterpillar Inc. of Peoria Ill., as model number G3516. The engine 12 generates mechanical energy which is transferred to the generator 14 by a crankshaft 16 of the engine 12.

The generator 14 is advantageously configured to produce electricity at a rated frequency when the engine 12 is running at a specific speed. In this case, the generator 14 produces electricity at the rated frequency when the engine 12 is rotating the crankshaft 16 at a speed of approximately 1500 RPM. At the rated frequency, the electrical output from the generator 14 can be paralleled to a power grid and sold to an electric utility company.

The engine assembly 10 further includes an air inlet 18, a fuel inlet 20 and a mixing chamber 22. The air inlet 18 advances ambient air to the mixing chamber 22. The fuel inlet 20 advances fuel from a low energy gaseous fuel source to the mixing chamber 22. For example, the low energy gaseous fuel can be collected from a manifold which extracts the low energy gaseous fuel from a coal mine prior to removing the coal. Also, for example, the low energy gaseous fuel can be collected from a manifold which extracts the low energy gaseous fuel from a landfill (Note that the methane gas in the low energy gaseous fuel is a naturally occurring byproduct of the decomposition of various waste products). Both of these sources produce a hydrocarbon fuel which contains between thirty and fifty percent methane. However, the two fuel sources differ in the amount of air contained in the low energy gaseous fuel. When the gaseous fuel is collected from a coal mine, the gaseous fuel is typically composed of methane and air whereas when the gaseous fuel is collected from a landfill, the gaseous fuel is typically composed of methane and carbon dioxide.

The engine assembly 10 also includes a fuel valve 24. The fuel valve 24 is positioned to control the amount of low energy gaseous fuel advanced through the fuel inlet 20 to the mixing chamber 22. The fuel valve 24 is a butterfly type valve, which rotates a plate between a closed position and a number of open positions. It should be appreciated that the fuel valve 24 is a restriction on the amount of fuel that can be advanced to the engine 12. Thus, the fuel valve 24 is advantageously configured to allow enough low energy gaseous fuel to be advanced through the inlet 20 in order to operate engine 12 at a maximum load condition. Note that the amount of low energy gaseous fuel required to run the engine 12 is a function of the energy content of the low energy gaseous fuel. Therefore, a fuel valve used in a engine assembly 10 that operates on a low energy gaseous fuel source which contains thirty percent hydrocarbon fuel must advance more low energy gaseous fuel to the engine 12 than a fuel valve used in a engine assembly 10 that operates on a low energy gaseous fuel source which contains fifty percent hydrocarbon fuel.

The low energy gaseous fuel and air are mixed in the mixing chamber 22 to form a fuel-air mixture which exits the mixing chamber 22 at the fuel-air mixture outlet 26. The fuel-air mixture is then advanced from the fuel-air mixture outlet 26 through a throttle 28 of the engine assembly 10 in a fuel-air mixture conduit 27. In some engines, the fuel-air mixture is advanced through a turbocharger prior to passing through the throttle 28. In such engines, the turbocharger increases the pressure of the fuel-air mixture. In addition, the turbocharger acts to further mix the fuel-air mixture prior to reaching the throttle 28.

The throttle 28 is operable to control the flow of the fuel-air mixture from mixing chamber 22 into an engine inlet 30. The throttle 28 is a butterfly type valve similar to the fuel valve 24. However, the throttle 28 controls the quantity of the fuel-air mixture advanced to the engine inlet 30 whereas the fuel valve 24 controls the ratio of air-to-gaseous fuel, or air-fuel ratio of the fuel-air mixture advanced to the engine inlet 30.

The engine assembly 10 further includes a pressure sensor 32 and an engine control unit 34. The pressure sensor 32 is positioned in the fuel-air mixture conduit 27 to measure the pressure caused by the flow of the fuel-air mixture passing through the fuel-air mixture conduit 27 and generates a load signal on a data line 36 in response thereto. Note that the pressure in the fuel-air mixture conduit 27 is proportional to the engine load. The load signal is sent from the pressure sensor 32 to the engine control unit 34 via the data communication line 36.

The engine assembly 10 further includes a temperature sensor 33. The temperature sensor 33 is positioned in the fuel-air mixture conduit 27 to measure the temperature of the fuel-air mixture passing through the fuel-air mixture conduit 27 and generates a temperature signal on the signal line 37 in response thereto. The temperature signal is sent from the temperature sensor 33 to the engine control unit 34 via the data communication line 37.

The engine control unit 34 includes a CPU 40 and memory device 42. The memory device 42 may suitably be a combination of read-only memory and random access memory which store program instructions for the CPU 40.

The fuel-air mixture that is advanced through the engine inlet 30 is subsequently advanced to a number of combustion chambers (not shown) of the engine 12. In the combustion chambers, the fuel-air mixture is combusted, and the resulting energy is converted into rotational mechanical energy of the crankshaft 16 by a number of pistons (not shown) and connecting rods (not shown). It should be appreciated that increasing the amount of the fuel-air mixture combusted in the combustion chambers will correspondingly increase the rotational energy of the crankshaft 16. In contrast, decreasing the amount of the fuel-air mixture combusted in the combustion chambers will correspondingly decrease the rotational energy of the crankshaft 16.

Alternately, if the crankshaft 16 drives the generator 14 at a constant speed to produce electricity, increasing the amount of the fuel-air mixture advanced into the engine 12 allows the engine 12 to drive a larger load. In contrast, decreasing the amount of the fuel-air mixture advanced into the engine 12 may only allows the engine 12 to drive a smaller load. In the present invention, the larger load allows the engine 12 to drive the generator 14 to produce a greater amount of electricity at the rated frequency whereas a smaller load allows the engine 12 to drive the generator 14 to produce a lesser amount of electricity at the rated frequency.

The rotational speed of the crankshaft 16 is measured by a speed sensor 44. The speed sensor 44 uses a magnetic pickup to measure the rotational speed of the crankshaft 16. The speed sensor 44 sends a speed signal to the engine control unit 34 via the data communication line 46.

The combustion of the fuel-air mixture in the combustion chambers produces a number of exhaust gases. After the fuel-air mixture is combusted in the combustion chambers of the engine 12, the exhaust gases are advanced through an engine outlet 48. From the engine outlet 48, the exhaust gases are advanced through an exhaust conduit 50 prior to being released into the atmosphere. An oxygen sensor 52 is positioned within the exhaust conduit 50 to measure the amount of oxygen in the exhaust gases. The oxygen sensor 52 is commercially available from NGK Spark Plugs USA, Inc. of Irvine, Calif. as part number TL-7113. The oxygen sensor 52 produces an oxygen content signal that is sent to the engine control unit 34 via the data communication line 54.

The engine control unit 34 is operable to receive four input signals: the load signal, the temperature signal, the speed signal, and the oxygen content signal. Upon receiving these input signals, the CPU 40 of the engine control unit 34 is able to recall a series of instructions stored in the memory device 42 and generates two output signals in response to the four input signals.

The first output signal is a fuel valve adjustment signal. The fuel valve adjustment signal is sent via the data line 64 to control the fuel valve 24 to either increase the air-fuel ratio of the fuel-air mixture advanced from mixing chamber 22 or decrease the air-fuel ratio of fuel-air mixture advanced from the mixing chamber 22. Thus, the fuel valve adjustment signal controls the composition, or air-fuel ratio, of the fuel-air mixture that is combusted in the combustion chambers of the engine 12.

The second output signal is the throttle position signal. The throttle position signal is sent via a data line 66 to control the throttle 28 to either increase or decrease the amount of the fuel-air mixture advanced to the engine inlet 30. Thus, the throttle position signals provide control of the amount of the fuel-air mixture that is combusted in the combustion chambers of the engine 12.

Figure 2:
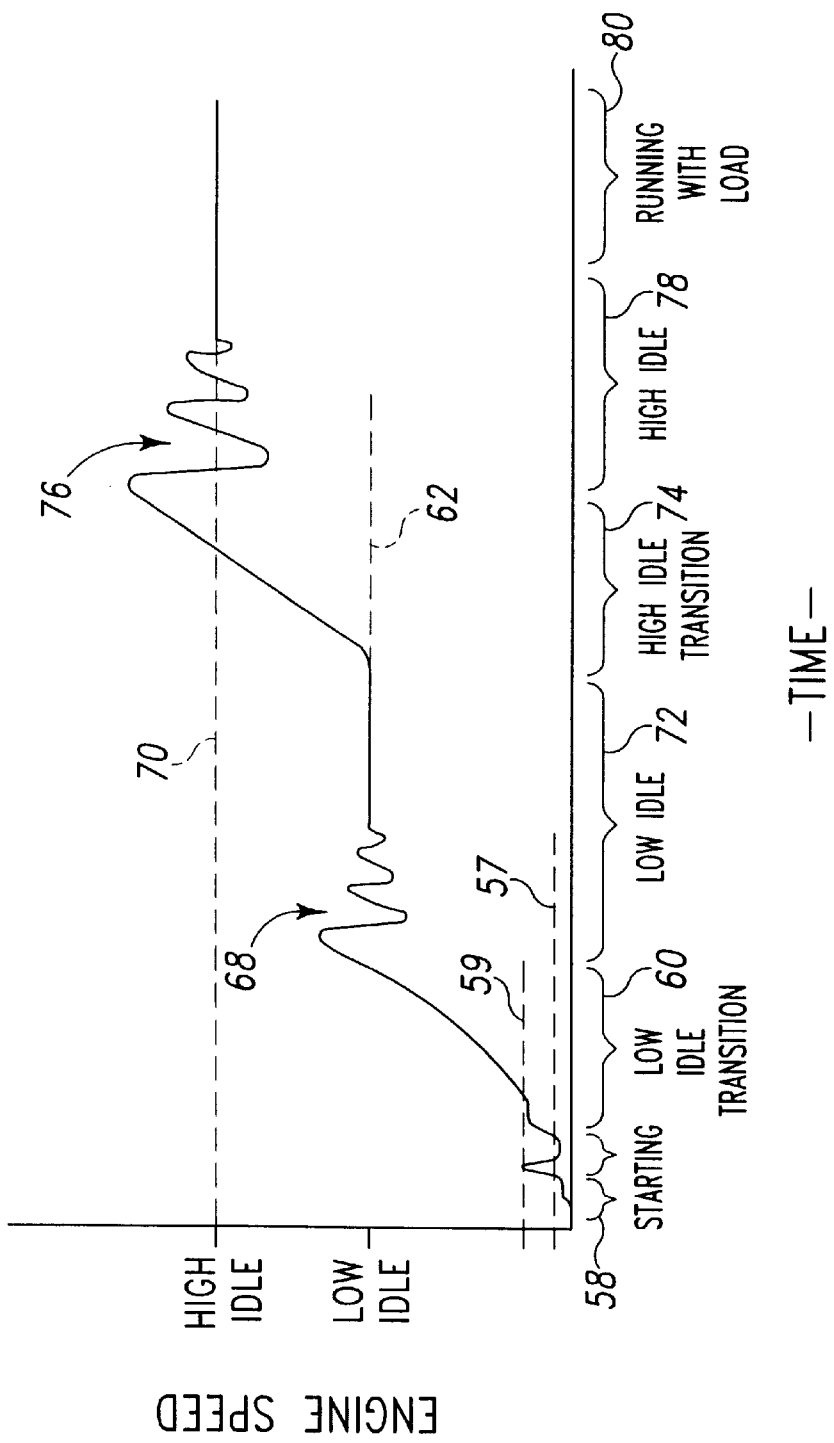
FIG. 2 is a graph showing the engine RPM at various periods of operation of the engine of FIG. 1.

Referring now to FIG. 2, there is shown a graph which illustrates the various periods of operation of the engine 12. During the starting period 58, the CPU 40 sends a fuel valve adjustment signal via the data line 64 which causes the fuel valve 24 to be positioned in a closed position. In the closed position, the fuel valve 24 prevents fuel from advancing to the mixing chamber 22 through the inlet 20. During the starting period 58, the generator 14 places no load on the engine 12. The CPU 40 sends a throttle position signal via the data line 66 which positions the throttle 28 in a throttle starting position. In the throttle starting position, the throttle 28 allows a quantity of the air-fuel mixture to advance to the combustion chambers which, when combusted, will cause crankshaft 16 of the engine to rotate at a startup speed 59. For this engine 12, the startup speed 59 is equal to about 400 RPM.

The engine assembly 10 further includes a starter 56 which is operable to rotate the crankshaft 16 of the engine 12. The starter 56 rotates the crankshaft 16 of the engine 12 to a starter speed 57 during the startup period 58. The starter speed 57 is less than the startup speed 59.

During startup of the engine 12, a feathering procedure is used to open the fuel valve 24 so as to smoothly and reliably start the engine 12 with the low energy fuel. In particular, the fuel valve 24 is gradually moved from the closed position to a full open position over a period of time. During this movement, the fuel valve 24 advances a flow of gaseous fuel which is combusted by the engine 12 so as to cause the rotation of the crankshaft 16 at the startup speed 59. It should be appreciated that the fuel-air mixture created by the feathering procedure is slightly rich, i.e. the fuel-air mixture contains an excess of fuel. The slightly rich fuel-air mixture is easier to combust in the combustion chambers during the startup period 58.

The CPU 40 controls the feathering procedure by sending a series of fuel valve adjustment signals via the data line 64 which incrementally moves the fuel valve 24 to the full open position over the period of time. For the engine 12, the period of time is equal to approximately 13 seconds. During this period of time, the CPU 40 monitors the data communication line 46 to determine if the speed signal from the speed sensor 44 corresponds to a speed which is greater than the startup speed 59, which is approximately 400 RPM. If the CPU 40 receives a speed signal which corresponds to a speed of greater than the startup speed within the period of time, then the engine 12 has started and the fuel valve 24 is positioned in a default starting position. The gradual opening of the fuel valve 24 prevents the rich mixture from being advanced to the combustion chambers too rapidly. Rich mixtures tend to inhibit combustion of the fuel-air mixture if introduced too rapidly into the combustion chambers during the startup period.

If the CPU 40 does not receive a speed signal which corresponds to a speed of greater than the startup speed 59 within the period of time, then the engine 12 has not started. The fuel valve 24 is returned to the closed position. The feathering procedure is repeated a number of times to attempt to start the engine. If the CPU 40 receives a speed signal which corresponds to a speed of greater than the startup speed 59 within one of the number of periods of time, then the engine 12 has started.

If the CPU 40 does not receive a speed signal which corresponds to a speed of greater than startup speed 59 within the one of the number of periods of time, the engine 12 has not started and a further attempt to start the engine 12 is not made. Generally, it has been found that the engine 12 will start prior to the third attempt.

Prior to running at a high idle speed 70, where the generator 14 parallels the power grid of the electric utility company, the engine 12 is run at a low idle speed 62 of approximately 1000 RPM. During a low idle transition period 60, the engine 12 increases speed from the starting speed 59 to the low idle speed 62. To transition the engine 12 to the low idle speed 62, the throttle 28 is positioned in a throttle low idle position. In the throttle low idle position, the throttle 28 allows a quantity of the air-fuel mixture to advance to the combustion chambers which, when combusted, will cause crankshaft 16 of the engine to rotate at the low idle speed 62.

In addition, the CPU 40 monitors the speed signal via the data line 46. The CPU 40 sends throttle position signals to the throttle 28 via the data line 66 to control the throttle so that the engine 12 operates at the low idle speed 62. In particular, if the CPU 40 determines that the speed signal corresponds to a speed less than the low idle speed 62, the throttle 28 is positioned to advance a greater quantity of the fuel-air mixture to the combustion chambers of the engine 12. In contrast, if the CPU 40 determines that the speed signal corresponds to a speed greater than the low idle speed 62, the throttle 28 is positioned to advance a lesser quantity of the fuel-air mixture to the combustion chambers of the engine 12.

However, since the fuel-air mixture advanced to the combustion chambers is rich, it is difficult to control the engine speed to the low idle speed 62. In particular, the rich mixture tends to cause an oscillation 68 about the low idle speed 62. During a low idle period 72, it is desirable to reduce the oscillation 68 in the speed of the engine 12. It has been determined that controlling the composition of the fuel-air mixture being combusted in the combustion chambers enables the engine 12 to maintain the low idle speed 62 while minimizing the oscillation 68. In particular, experiments indicated that a stable low idle speed 62 could be obtained when the oxygen content of the exhaust gases was maintained at approximately 0.3% oxygen. Therefore, the CPU 40 monitors the data line 54 for the oxygen content signal which corresponds to the amount of oxygen in the exhaust gases advanced through the exhaust conduit 50.

The CPU 40 sends fuel valve adjustment signals to the fuel valve 24 based on the oxygen content signal received from the oxygen sensor 52. In particular, if the CPU 40 determines that the oxygen content signal corresponds to a percentage of oxygen in the exhaust gases greater than the 0.3%, the amount of oxygen in the fuel-mixture is decreased by sending a fuel valve adjustment signal to the fuel valve 24 which causes the fuel valve 24 to increase the air-fuel ratio of the fuel-air mixture advanced from the mixing chamber 22. On the other hand, if the CPU 40 determines that the oxygen content signal corresponds to a percentage of oxygen in the exhaust gases less than the 0.3%, the amount of oxygen in the fuel-mixture is increased by sending a fuel valve adjustment signal to the fuel valve 24 which causes the fuel valve 24 to decrease the air-fuel ratio of the fuel-air mixture advanced from the mixing chamber 22.

By maintaining a fuel-air mixture which, when combusted, produces exhaust gases with a percentage of oxygen of 0.3%, the engine 12 can be maintained at the low idle speed 62 within a tolerance of one RPM. Maintaining such a tight control of the speed of the engine 12 causes the engine 12 operate smoothly at the low idle speed 62.

To parallel the generator 14 with the power grid of the electric utility company, the speed of the engine 12 must be increased from the low idle speed 62 to the high idle speed 70, which is approximately 1500 RPM. In order to achieve the above, the engine 12 must pass through a high idle transition period 74. During the high idle transition period 74, the engine 12 increases speed from the low idle speed 62 to the high idle speed 70. Prior to the transition to the high idle speed 70, the CPU 40 sends a fuel valve adjustment signal to the fuel valve 24 to increase the flow rate of gaseous fuel to the mixing chamber 22 to produce a rich fuel-air mixture. To transition the engine 12 to the high idle speed 70, the throttle 28 is positioned in a throttle high idle position. In the throttle high idle position, the throttle 28 allows a quantity of the air-fuel mixture to advance to the combustion chambers which, when combusted, will cause crankshaft 16 of the engine to rotate at the high idle speed 70.

In addition, the CPU 40 monitors the speed signal from the speed sensor 44 via the data line 46. The CPU 40 sends throttle position signals to the throttle 28 via the data line 66 to control the throttle so that the engine 12 operates at the high idle speed 70. In particular, if the CPU 40 determines that the speed signal corresponds to a speed of less than the high idle speed 70, the throttle 28 is positioned to advance a greater quantity of the fuel-air mixture to the combustion chambers. In contrast, if the CPU 40 determines that the speed signal corresponds to a speed of greater than the high idle speed 70, the throttle 28 is positioned to advance a lesser quantity of the fuel-air mixture to the combustion chambers of the engine 12.

However, since the fuel-air mixture advanced to the combustion chambers is rich, it is difficult to control the engine speed to the high idle speed 70. In particular, the rich mixture tends to cause an oscillation 76 about the high idle speed 70. During the high idle period 78, it is desirable to reduce the oscillation 76 in the speed of the engine 12. It was determined that controlling the composition of the fuel-air mixture being combusted enabled the engine 12 to maintain the high idle speed 70 while minimizing the oscillation 76. In particular, experiments indicated that a stable high idle speed 70 could be obtained when the oxygen content of the exhaust gases was maintained at approximately 0.3% oxygen. Therefore, the CPU 40 monitors the data line 54 for the oxygen content signal which corresponds to the oxygen percentage in the exhaust gases advanced through the exhaust conduit 50.

The CPU 40 sends fuel valve adjustment signals to the fuel valve 24 based on the oxygen content signal received from the oxygen sensor 52. In particular, if the CPU 40 determines that the oxygen content signal corresponds to a percentage of oxygen in the exhaust gases greater than the 0.3%, the amount of oxygen in the fuel-mixture is decreased by sending a fuel valve adjustment signal to the fuel valve 24 which causes the fuel valve 24 to increase the air-fuel ratio of the fuel-air mixture advanced from mixing chamber 22. On the other hand, if the CPU 40 determines that the oxygen content signal corresponds to a percentage of oxygen in the exhaust gases less than the 0.3%, the amount of oxygen in the fuel-mixture is increased by sending a fuel valve adjustment signal to the fuel valve 24 which causes the fuel valve 24 to decrease the air-fuel ratio of the fuel-air mixture advanced from the mixing chamber 22.

By maintaining a fuel-air mixture which when combusted produces exhaust gases with a percentage of oxygen of 0.3%, the engine 12 can be maintained at the high idle speed 70 within a tolerance of one RPM. Maintaining such a tight control of the speed of the engine 12 causes the engine 12 to operate smoothly at the high idle speed 70.

It should be appreciated that once the engine 12 is running at the high idle speed 70, the generator 14 is running at the rated speed and a load can be added to the generator 14 to produce electricity. However, the addition of a load to the engine 12 increases the production of $NO_x$, particularly at high loads.

Figure 3:
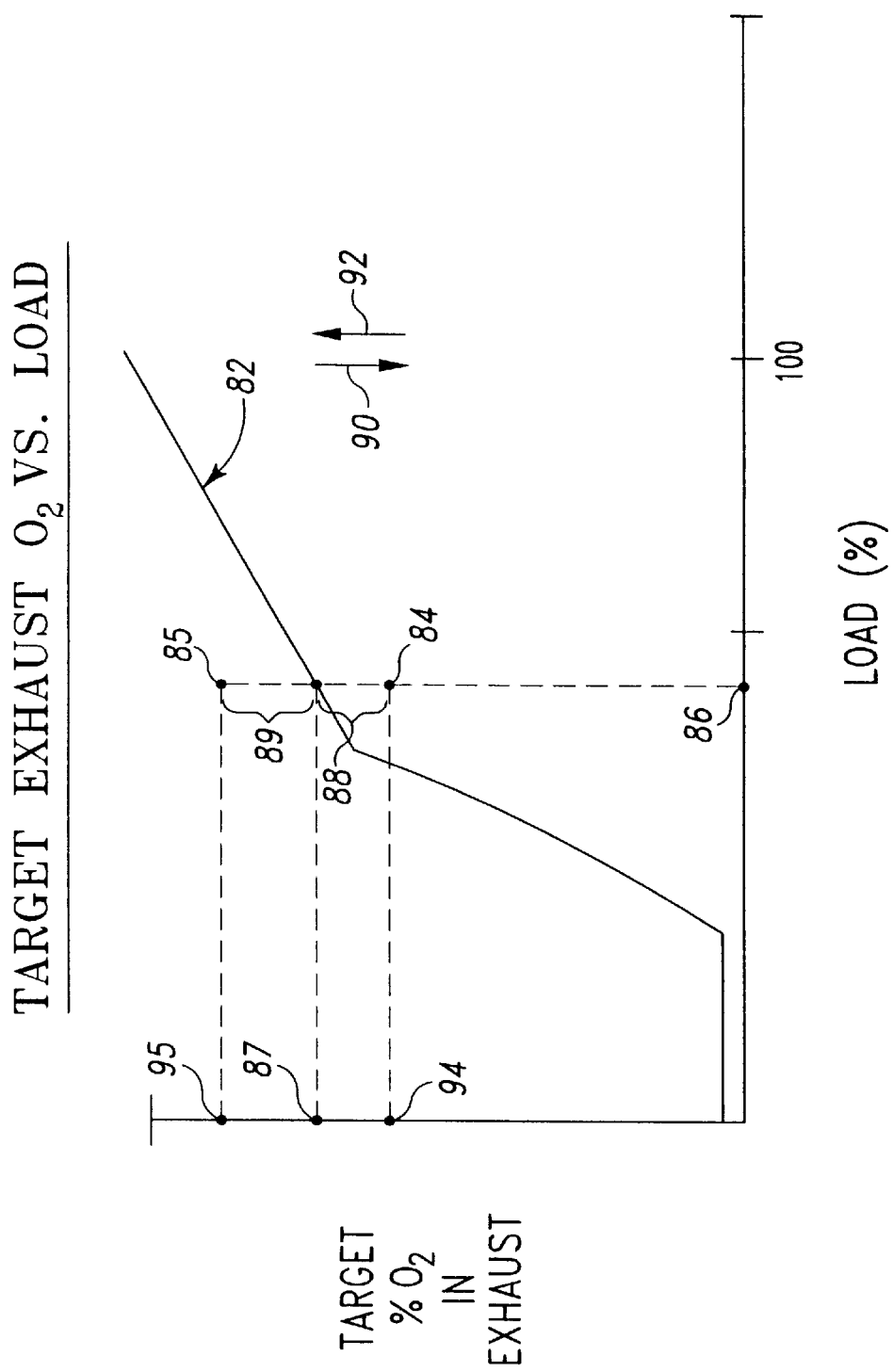
FIG. 3 is a graph of target oxygen values verses load for the internal combustion engine assembly of FIG. 1.

Referring now to FIG. 3, there is shown a map of target oxygen values in the exhaust gases verses the load on the engine. Note that this map corresponds to running the engine 12 at the high idle speed 70 during operation in load period 80 (shown in FIG. 2). The target oxygen values are experimentally determined. For each load condition, the engine 12 was run with a number of fuel-air mixtures by adjusting the fuel valve 24.

During each experiment, the percent oxygen in the exhaust gases and the amount of $NO_x$ were recorded. The oxygen percentage was determined by the oxygen content signal sent from the oxygen sensor 52 via line 54 to the engine control unit 34. The amount of $NO_x$ was measured by an external $NO_x$ sensor 82 (shown in phantom in FIG. 1) positioned to measure exhaust gases which are advanced through the exhaust conduit 50 and expelled into the atmosphere. For each engine load at the high idle speed 70, a target oxygen percentage was chosen which corresponds to an acceptable level of $NO_x$ in the exhaust gases that are advanced through the exhaust conduit 50. Experiments were performed from a zero percentage or no load condition to a one hundred percent or maximum load condition to produce a target oxygen curve 82. The target oxygen curve 82 is used to form a data table of target oxygen values for each engine load condition from no load to maximum load. The data table is then stored in the memory device 42 of the engine control unit 34.

During operation of the engine 12, the CPU 40 monitors the speed signal from the speed sensor 44 on the data line 46 to control the throttle 28 so that the engine 12 operates at the high idle speed 70 (shown in FIG. 2).

During operation, the CPU 40 must then determine the load on the engine 12. In particular, the CPU 40 monitors the data line 36 for the load signal from the pressure sensor 32. The CPU 40 determines the load on the engine 12 from the load signal.

In order to more accurately control the $NO_x$ emissions of the engine 12, the temperature signal is used to adjust the target oxygen curve 82. In particular, the temperature signal is used to compensate for changes in the temperature of the fuel-air mixture in the fuel-air mixture conduit 27. At an exemplary load point 86 and a baseline temperature, the target oxygen value on the target oxygen curve 82 corresponds to a point 87.

If the temperature in the fuel-air conduit 27 is less than the baseline temperature, then the air-fuel ratio of the fuel-air mixture must be reduced. To reduce the air-fuel ratio of the fuel-air mixture, the target oxygen value is adjusted downwardly to a point 94 from the point 87. On the other hand, if the temperature in the fuel-air conduit 27 is greater than the baseline temperature, then the air-fuel ratio of the fuel-air mixture must be increased. To increase the air-fuel ratio of the fuel-air mixture, the target oxygen value is adjusted upwardly to a point 95 from the point 87.

The entire target oxygen curve 82 is adjusted a distance 88 downwardly if the temperature in the fuel-air conduit 27 is less than the baseline temperature or a distance 89 upwardly if the temperature in the fuel-air conduit 27 is greater than the baseline temperature. It should be appreciated that the distances 88 and 89 are proportional to the temperature difference between the baseline temperature of the fuel-air mixture in the fuel-air conduit 27, and the actual temperature of the fuel-air mixture in the fuel-air conduit 27.

Once the target oxygen curve 82 has been adjusted for temperature, the CPU 40 extracts a target oxygen valve which corresponds to the load from the data table stored in the memory device 42. For example, if the CPU 40 determines that the load on the engine 12 corresponds to the point 86 and the target oxygen curve has been adjusted upwardly a distance 89, then the CPU 40 extracts a target oxygen value from the data table that corresponds to a point 85. On the other hand, if the CPU 40 determines that the load on the engine 12 corresponds to the point 86 and the target oxygen curve has been adjusted downwardly a distance 88, then the CPU 40 extracts a target oxygen value from the data table that corresponds to a point 84.

The CPU then monitors the data line 54 and determines an actual oxygen content of the exhaust gases in the exhaust conduit 50 from the oxygen content signal received from the oxygen sensor 52 via the data line 54. If the actual oxygen content is less than the target oxygen content, then the CPU 40 sends a fuel valve adjustment signal to the fuel valve 24 which causes the fuel valve 24 to decrease the air-fuel ratio of the fuel air mixture advanced from the mixing chamber 22. Whereas, if the actual oxygen content is greater than the target oxygen content, then the CPU 40 sends a fuel valve adjustment signal to the fuel valve 24 which causes the fuel valve 24 to increase the air-fuel ratio of the fuel-air mixture advanced from the mixing chamber 22.

Due to variations in the gaseous fuel that enters the fuel inlet 20, the data curve 82 must be calibrated to the actual gaseous fuel that is received in the fuel inlet 20. This calibration is performed prior to operation the engine 12. There are two types of variation in the gaseous fuel that enters the fuel inlet 20. The first variation in the gaseous fuel is the amount of hydrocarbon fuel that the gaseous fuel contains. Each coal mine or landfill produces a gaseous fuel with a unique amount of hydrocarbon fuel, typically between thirty and fifty percent. The second variation in the gaseous fuel is in the amount of oxygen in the gaseous fuel. Gaseous fuels obtained from coal mines are generally comprised essentially of methane and air, whereas gaseous fuels obtained from landfills are generally comprised essentially of methane and carbon dioxide. Such variations in the gaseous fuel affects the amount of $NO_x$ produced during combustion of the fuel-air mixture in the combustion chambers.

A test run of the engine 12 is performed to calibrate the target oxygen curve 82. In particular, the engine is run at a constant load, such as the exemplary load point 86, and the CPU 40 adjusts the fuel valve 24 to hold the oxygen percentage to the target oxygen value that corresponds to the point 87. The external $NO_x$ sensor 82 is then used to determine the actual $NO_x$ emitted out of the exhaust conduit 50. If the $NO_x$ emissions are not within the desired range, a number of test runs are performed with various target oxygen values at the load point 86 to determine a target oxygen value that produces an acceptable level of $NO_x$.

The target oxygen curve 82 is adjusted a distance 89 upwardly in the general direction of arrow 92 to the point 85 if the point 85 corresponds to an acceptable level $NO_x$. On the other hand, the target oxygen curve 82 is adjusted a distance 88 downwardly in the general direction of arrow 90 to the point 84 if the point 84 corresponds to an acceptable level $NO_x$.

It should be appreciated that the upward adjustment of the target oxygen curve 82 by a distance 89 changes the target oxygen value from the point 87 to the point 95, whereas the downward adjustment of the target oxygen curve 82 by a distance 88 changes the target oxygen value from the point 87 to the point 94. It should further be appreciated that the adjustment of the target oxygen curve 82 allows the engine 12 to combust any one of a variety of low energy gaseous fuels while controlling the $NO_x$ emissions to an acceptable level.

Industrial Applicability

In operation, during the starting period 58, the feathering procedure is used to control the fuel valve 24 so as to allow the engine 12 to reliably start while using a low energy gaseous fuel. After the engine 12 has started, the engine 12 is accelerated to the low idle speed 62.

When the engine has reached the low idle speed 62, the engine control unit 34 controls the fuel valve 24 to produce a smooth idle. In particular, the engine control unit 34 reads the oxygen content signal from the oxygen sensor 52 and adjusts the fuel valve 24 to produce a fuel-air mixture that when combusted produces exhaust gases with a 0.3% oxygen content. Controlling the fuel valve 24 has the allows the engine control unit 34 to control the engine speed to the low idle speed 62 to within a tolerance one RPM.

To operate the generator 14 to parallel the power grid of the electric utility company, the engine 12 is accelerated to a high idle speed 70. When the engine has reached the high idle speed 70, the engine control unit 34 controls the fuel valve 24 to produce a smooth idle. In particular, the engine control unit 34 reads the oxygen content signal from the oxygen sensor 52 and adjusts the fuel valve 24 to produce a fuel-air mixture that when combusted produces exhaust gases with a 0.3% oxygen content. Controlling the fuel valve 24 allows the engine control unit 34 to control the engine speed to the high idle speed 70 to within a tolerance one RPM.

To generate electricity, the generator 14 places a load on the engine 12. To run the engine 12 under such load, the engine control unit 34 calculates the load by monitoring the data line 36 for a pressure or load signal. The engine control unit 34 then extracts a target oxygen value from the data table which contains data which represents the target oxygen value curve 82. The target oxygen values in the data table correspond to a low $NO_x$ operating condition for each load. The engine control unit 34 then controls the fuel valve 24 to produce a fuel-air mixture which, when combusted by the engine 12, forms exhaust gases having an oxygen percentage equal to the target oxygen value. Controlling the fuel valve 24 reduces $NO_x$ emissions at any load condition.

However, prior to operation of the engine 12, the target oxygen value curve 82 must be adjusted in the general direction of either arrow 90 or arrow 92 to compensate for the differences between the experimental conditions used to generate the target oxygen curve 82 and the actual operation conditions of the engine 12. Adjusting the target oxygen curve 82 allows the engine 12 to produce low $NO_x$ emissions while combusting any one of a variety of low energy gaseous fuels.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For example, although the internal combustion engine 12 is herein described as being a spark ignition engine, and has significant advantages thereby in the present invention, the engine 12 could also be a multifuel or other type of internal combustion engine.

Also, for example, although the load applied to the internal combustion engine 12 is herein described as being the load created by driving the electric generator 14, and has significant advantages thereby in the present invention, the load on the internal combustion engine 12 could be the load created by driving another mechanism, such as a pump.

What is claimed is:

1. A method of controlling an internal combustion engine assembly which includes (i) an internal combustion engine having an engine inlet and an engine outlet, (ii) a mixing chamber having an air inlet, a fuel inlet, and a fuel-air mixture outlet, (iii) a fuel valve which controls the ratio of air-to-gaseous fuel in a fuel-air mixture advanced from the fuel-air mixture outlet of the mixing chamber, and (iv) a throttle operable to control flow rate of the fuel-air mixture which is advanced from the fuel-air mixture outlet to the engine inlet, comprising the steps of:

operating the internal combustion engine assembly at a substantially constant predetermined speed;

determining oxygen content of exhaust gases advanced through the engine outlet and generating an oxygen content signal in response thereto;

measuring a parameter related to load on the internal combustion engine and generating a signal in response thereto;

calculating the internal combustion engine assembly load based upon the substantially constant predetermined speed and the signal; and adjusting the fuel valve to alter the ratio of air-to-gaseous fuel of the fuel-air mixture advanced through the fuel-air outlet of the mixing chamber based on the oxygen content signal and the calculated load.

2. The method of claim 1, wherein the internal combustion engine assembly further includes (i) an exhaust conduit positioned in fluid communication with the engine outlet, and (ii) an oxygen sensor positioned in the exhaust conduit for generating the oxygen content signal.

3. The method of claim 1, wherein the internal combustion engine assembly further includes (i) a fuel-air mixture conduit which couples the fuel-air mixture outlet to the engine inlet, and (ii) a pressure sensor positioned in the fuel-air mixture conduit for generating the signal.

4. The method of claim 1, wherein:

the internal combustion engine assembly further includes (i) a memory device, and (ii) a data table stored in the memory device, the data table includes a plurality of target oxygen values which correspond to a respective plurality of measured load values, and the adjusting step includes (i) retrieving a first target oxygen value from said plurality of target oxygen values which corresponds to said calculated load, (ii) comparing said first target oxygen value to said oxygen content signal and generating a fuel valve adjustment signal in response thereto, and (iii) adjusting the fuel valve to alter the ratio of air-to-gaseous fuel of the fuel air mixture advanced through the fuel-air mixture outlet of the mixing chamber based on the fuel valve adjustment signal.

5. The method of claim 4, wherein the correspondence between the plurality of target oxygen values and the plurality of calculated load values are experimentally determined.

6. The method of claim 4, further comprising the steps of:

determining $NO_x$ content of exhaust gases advanced through the engine outlet and generating a $NO_x$ content signal in response thereto; and adjusting the plurality of target oxygen values based on the $NO_x$ content signal.

7. The method of claim 6, wherein:

the internal combustion engine assembly further includes a $NO_x$ sensor positioned relative to the exhaust gases which are advanced through the engine outlet for generating the $NO_x$ content signal.

8. The method of claim 1, wherein:

the gaseous fuel contains approximately X% hydrocarbon fuel, and

30<X<40.

9. The method of claim 1, further comprising the step of:

adjusting the fuel valve to alter the ratio of air-to-gaseous fuel in the fuel-air mixture advanced from the fuel-air mixture outlet of the mixing chamber until the oxygen content signal reaches a predetermined oxygen value in response to the calculated load being below a predetermined value.

10. The method of claim 1, further comprising the steps of (i) detecting an engine start-up condition, and (ii) performing an engine start-up routine in response to the detecting step, wherein the engine start-up routine includes the steps of:

positioning the fuel valve in a closed position so that none of the gaseous fuel is advanced through the fuel inlet of the mixing chamber;

determining engine speed of the internal combustion engine and generating an engine speed signal in response thereto; and continuously adjusting the fuel valve to increase the ratio of air-to-gaseous fuel in the fuel-air mixture advanced through the fuel-air mixture outlet of the mixing chamber after the fuel valve positioning step until the engine speed signal reaches a predetermined level.

11. The method of claim 10, wherein the continuously adjusting step includes the step of terminating the engine start-up routine performing step if the engine speed signal does not reach the predetermined level within a predetermined time period.

12. A method of controlling a internal combustion engine assembly which includes (i) an internal combustion engine having an engine inlet and an engine outlet, (ii) a mixing chamber having an air inlet, a gaseous fuel inlet, and a fuel-air mixture outlet, (iii) a fuel valve which controls the ratio of air-to-gaseous fuel in a fuel-air mixture advanced from the fuel-air mixture outlet of the mixing chamber, and (iv) a throttle operable to control flow rate of the fuel-air mixture which is advanced from the fuel-air mixture outlet to the engine inlet, comprising the steps of:

operating the internal combustion engine assembly at a substantially constant predetermined speed;

determining oxygen content of exhaust gases advanced through the engine outlet and generating an oxygen content signal in response thereto;

measuring a parameter related to load on the internal combustion engine and generating a signal in response thereto;

calculating the internal combustion engine assembly load based upon the substantially constant predetermined speed and the signal; and adjusting the fuel valve to alter the ratio of air-to-gaseous fuel in the fuel-air mixture advanced through the fuel-air mixture outlet of the mixing chamber based on the oxygen content signal and the calculated load, wherein the internal combustion engine assembly further includes (i) an exhaust conduit positioned in fluid communication with the engine outlet, and (ii) an oxygen sensor positioned in the exhaust conduit for generating the oxygen content signal, and wherein the internal combustion engine assembly further includes (i) a fuel-air mixture conduit which couples the fuel-air mixture outlet to the engine inlet, and (ii) a pressure sensor positioned in the fuel-air mixture conduit for generating the signal.

13. The method of claim 12, wherein:

the internal combustion engine assembly further includes (i) a memory device, and (ii) a data table stored in the memory device, the data table includes a plurality of target oxygen values which correspond to a respective plurality of measured load values, and the adjusting step includes (i) retrieving a first target oxygen value from the plurality of target oxygen values which corresponds to the calculated load (ii) comparing the first target oxygen value to the oxygen content signal and generating a fuel valve adjustment signal in response thereto, and (iii) adjusting the fuel valve to alter the ratio of air-to-gaseous fuel in the fuel-air mixture advanced through the fuel-air mixture outlet of the mixing chamber based on the fuel valve adjustment signal.

14. The method of claim 13, wherein the correspondence between the plurality of target oxygen values and the plurality of calculated load values are experimentally determined.

15. The method of claim 13, further comprising the steps of:

determining $NO_x$ content of exhaust gases advanced through the engine outlet and generating a $NO_x$ content signal in response thereto; and adjusting the fuel valve to alter the ratio of air-to-gaseous fuel in the fuel-air mixture advanced through the fuel-air mixture outlet of the mixing chamber based on the $NO_x$ content signal and the calculated load.

16. The method of claim 12, wherein:

the gaseous fuel contains approximately X% hydrocarbon fuel, and $30<X<40$.

* * * * *